(12) United States Patent
Moser

(10) Patent No.: US 11,396,062 B2
(45) Date of Patent: Jul. 26, 2022

(54) LASER MACHINING SYSTEM FOR MACHINING A WORKPIECE BY MEANS OF A LASER BEAM AND METHOD FOR CONTROLLING A LASER MACHINING SYSTEM

(71) Applicant: Precitec GmbH & Co. KG, Gaggenau (DE)

(72) Inventor: Rüdiger Moser, Malsch (DE)

(73) Assignee: Precitec GmbH & Co. KG, Gaggenau (DE)

( * ) Notice: Subject to any disclaimer, the term of this patent is extended or adjusted under 35 U.S.C. 154(b) by 115 days.

(21) Appl. No.: 16/790,219

(22) Filed: Feb. 13, 2020

(65) Prior Publication Data

US 2020/0262004 A1 Aug. 20, 2020

(30) Foreign Application Priority Data

Feb. 14, 2019 (DE) ..................... 10 2019 103 734.4

(51) Int. Cl.
*B23K 26/04* (2014.01)
*B23K 26/03* (2006.01)
(Continued)

(52) U.S. Cl.
CPC ............ *B23K 26/032* (2013.01); *B23K 26/21* (2015.10); *B23K 26/702* (2015.10); *G01B 9/02091* (2013.01)

(58) Field of Classification Search
CPC .... B23K 26/032; B23K 26/21; B23K 26/702; G01B 9/02091
(Continued)

(56) References Cited

U.S. PATENT DOCUMENTS

| 6,791,057 B1 * | 9/2004 | Kratzsch | B23K 26/032 |
| | | | 219/121.62 |
| 8,735,768 B2 * | 5/2014 | Urashima | B23K 26/26 |
| | | | 219/121.75 |

(Continued)

FOREIGN PATENT DOCUMENTS

| DE | 198 52 302 A1 | 5/2000 |
| DE | 10 2015 012 565 B3 | 10/2016 |
| DE | 102018105093 A1 | 9/2018 |

OTHER PUBLICATIONS

Fabbro, R. et al. "Study of keyhole behaviour for full penetration Nd-Yag CW laser welding" Journal of Physics D: Applied Physics, vol. 38, No. 12, 2005, pp. 1881-1887; URL: https://doi.org/10.1088/0022-3727/38/12/005.

(Continued)

*Primary Examiner* — Jimmy Chou
(74) *Attorney, Agent, or Firm* — Dinsmore & Shohl LLP

(57) ABSTRACT

A laser machining system, or laser welding system, for machining a workpiece includes: a laser machining head for directing a laser beam onto a workpiece to produce a vapor capillary; an optical measuring device using an optical measuring beam; an image acquisition unit to capture an image of a region of the workpiece surface containing the vapor capillary and a measuring spot produced by irradiation with the measuring beam. The system determines positions of the measuring spot and vapor capillary based on the image. A method includes: directing the laser beam onto a workpiece surface to produce a vapor capillary; directing an optical measuring beam onto the surface to measure a depth of the vapor capillary; capturing an image of a region containing the vapor capillary and a measuring spot from the optical measuring beam; and determining, based on the captured image, position of the measuring spot and vapor capillary.

15 Claims, 8 Drawing Sheets

(51) Int. Cl.
B23K 26/21 (2014.01)
B23K 26/70 (2014.01)
G01B 9/02091 (2022.01)

(58) Field of Classification Search
USPC ............ 219/121.62, 121.63, 121.64, 121.65,
219/121.66, 121.67, 121.72, 121.83,
219/121.85
See application file for complete search history.

(56) References Cited

U.S. PATENT DOCUMENTS

| | | | | |
|---|---|---|---|---|
| 9,427,823 | B2* | 8/2016 | Alfille | B23K 26/142 |
| 9,517,533 | B2* | 12/2016 | Uchida | B23K 26/21 |
| 10,578,428 | B2* | 3/2020 | Strebel | G01B 9/02091 |
| 2006/0011592 | A1* | 1/2006 | Wang | B23K 26/123 |
| | | | | 219/121.64 |
| 2012/0138586 | A1* | 6/2012 | Webster | B23K 15/085 |
| | | | | 219/121.64 |
| 2012/0285936 | A1* | 11/2012 | Urashima | G01B 9/02091 |
| | | | | 219/121.63 |
| 2013/0043225 | A1* | 2/2013 | Schurmann | B23K 26/048 |
| | | | | 219/121.64 |
| 2013/0068738 | A1* | 3/2013 | Schurmann | B23K 26/03 |
| | | | | 219/121.72 |
| 2016/0059350 | A1* | 3/2016 | Schoenleber | G01B 9/02091 |
| | | | | 219/121.81 |
| 2017/0120337 | A1* | 5/2017 | Kanko | G01B 9/02083 |
| 2020/0262004 | A1* | 8/2020 | Moser | B23K 26/702 |

OTHER PUBLICATIONS

Regaard, B. et al. "Error detection in lap welding applications using on-line melt pool contour analysis by coaxial process monitoring with external illumination" Physics Procedia. 41, 2007.

* cited by examiner

LASER MACHINING SYSTEM FOR MACHINING A WORKPIECE BY MEANS OF A LASER BEAM AND METHOD FOR CONTROLLING A LASER MACHINING SYSTEM

CROSS-REFERENCE TO RELATED APPLICATION

This application claims priority from German Application No. 10 2019 103 734.4 filed Feb. 14, 2019, the entire content of which is incorporated herein by reference.

FIELD OF THE INVENTION

The present invention relates to a laser machining system for machining a workpiece by means of a laser beam, in particular a laser welding system, and a method for controlling a laser machining system. The present invention preferably relates to a laser machining system with an optical coherence tomograph for interferometric distance measurement, and to a method for controlling the same.

BACKGROUND OF THE INVENTION

In a machining system for machining a workpiece by means of a laser beam, the laser beam exiting from a laser light source or an end of an optical fiber is focused or collimated onto the workpiece to be machined with the aid of a beam guiding and focusing optics. The machining may comprise, for example, laser cutting, laser soldering or laser welding, in particular laser deep welding. The laser machining system may comprise, for example, a laser machining head, in particular a welding head.

When the laser beam is projected onto the workpiece to be machined, the material of the workpiece, for example metal, is heated so intensely by the laser power in an irradiation region that it changes into a vaporous state or a plasma state. This region is referred to as the so-called "vapor capillary" or "keyhole".

It is desirable to determine or measure the depth of the vapor capillary resulting from laser welding as precisely as possible. The depth of the vapor capillary is dependent, for example, on a welding depth, i.e., the depth to which the metal was melted during a welding process. The depth of the vapor capillary is typically measured at the deepest point of the vapor capillary. This position is also referred to as "keyhole bottom" or "machining bottom". In the present disclosure, "depth of the vapor capillary" or "keyhole depth" denotes the maximum depth of the vapor capillary.

The depth of the vapor capillary is of great interest: on the one hand, knowledge of the depth of the vapor capillary allows conclusions about the strength of a welded joint to be drawn, i.e., whether the weld was sufficiently deep; on the other hand, knowledge of the depth of the vapor capillary can ensure that the weld seam on the underside is not visible, i.e., that there is no undesired root penetration.

FIG. 1 is a schematic cross-sectional view of a workpiece 10 to be machined during a laser machining process, in particular a welding process, which is carried out by a laser machining system. During the laser machining process, a laser beam 148 is projected onto a surface 16 of a workpiece 10 by means of a laser machining head (not shown) of the laser machining system, the laser beam being moved over the surface 16 along a so-called machining direction 80.

During this, a vapor capillary 12 is formed in a region between the surface 16 of the workpiece 10, onto which the laser beam 148 is projected, down to a certain depth within the workpiece 10. In the region of the vapor capillary, the material of the workpiece 10 is heated so intensely by the radiated laser power that it evaporates. In other words, the material in the region of the vapor capillary 12 is in a vaporous state. The vapor capillary 12 is surrounded by a region 14 in which the material is in a molten state, i.e., in a liquid state. Region 14 is also referred to as a "melt pool".

The depth of the vapor capillary is typically measured contactlessly using spectral interferometric distance measurement or optical distance measurement by means of optical coherence tomography ("OCT"). For this purpose, as shown in FIG. 1, an optical measuring beam 126 of an optical coherence tomograph (not shown) for measuring the depth of the vapor capillary 12 is projected onto the workpiece 10. At the point of incidence of the measuring beam on the workpiece 10, the so-called measuring spot, the measuring beam is reflected back by the workpiece 10 in the optical coherence tomograph. The measuring beam 126 may extend substantially in parallel or coaxially to the laser beam 148.

In order to be able to measure the depth of the vapor capillary correctly, the optical measuring beam has to be aligned in such a way that the light from the measuring beam reaches the lower end of the vapor capillary and the light reflected therefrom returns to the optical coherence tomograph.

However, it should be understood that the geometric properties of the vapor capillary, e.g., shape, size, etc., and their position on the workpiece surface depend on the parameters of the laser machining process. In addition to the feed speed, parameters such as the machining direction, the focus size of the laser beam, the material of the workpiece, and the welding geometry, i.e., the shape or the course of the weld, also play a crucial role.

For example, a variation in the feed speed of the laser beam has the following effects on properties of the vapor capillary: increase or decrease in the angle of inclination of the front wall of the vapor capillary; shift in the position of the deepest point of the vapor capillary (so-called "keyhole bottom") or of a lower opening of the vapor capillary when welding through into the wake; increase or decrease in the opening of the vapor capillary in the machining direction; or shift in the position of the opening of the vapor capillary relative to the lateral focus position of the laser beam, because a point on the workpiece surface takes a certain amount of time to reach a sufficient temperature to form a vapor capillary.

Since the geometric properties of the vapor capillary, in particular the position and size thereof, depend on the parameters of the laser machining process performed, as described above, the optical measuring beam must be adjustable to the respective laser machining process or must be controllable during the respective laser machining process. In particular, a point of incidence of the measuring beam (also referred to as "position of the measuring beam") on the workpiece or the focus position of the measuring beam must be adjustable or controllable. In particular, the position of the measuring beam on the material surface or the point of incidence of the measuring beam on the workpiece surface must be adjustable or controllable relative to the position of the vapor capillary on the workpiece surface, so that it is ensured that the measuring beam always hits the workpiece at the correct location for the welding depth measurement. The position on the workpiece surface may also be referred to as the "lateral position".

In the case of linear welding seams, i.e., straight-lined welding seams, a suitable position of the measuring spot relative to the position of the vapor capillary may be determined or set in advance for the respectively set process parameters and may then remain unchanged during the execution of the welding process. Therefore, in the case of linear welding seams, there may be a static position for the respective parameters.

In order to measure the deepest point of the vapor capillary, the optimal position of the optical measuring beam for the welding depth measurement must be determined for each set of parameters of the welding process before the welding process is carried out. That is, the setting, such as the orientation, focus position and/or position of the optical measuring beam relative to the laser beam or to the laser machining head, must be determined in advance. However, a change in the position of the measuring beam, e.g. due to drift of deflection units or other inaccuracies in the laser machining system, is not excluded and leads to a deviation from the ideal measuring position during the welding process. When using galvoscanners as a deflection unit for the measuring beam, it is difficult to prevent drift. Particularly in mass production, it must be ensured that the position of the measuring beam relative to the position of the vapor capillary remains unchanged for weeks, months or years. Furthermore, test welds on workpieces are required for the described presetting of the position of the measuring beam in order to ensure, for the respective set of parameters, that the deepest position of the vapor capillary is measured using the preset position of the measuring beam.

In the case of curved weld seams or weld tracks (e.g., a 90° curve, spiral, C-shaped geometries, etc.), it is necessary to adjust the position of the measuring spot during the welding process. At any given time during the welding process, the optimal position for the weld depth measurement of the measuring spot must be known and the position must be arrived at precisely during the laser machining process in order not to receive incorrect depth information about the vapor capillary. In the case of a curved weld seam, the method for determining the deepest point of the vapor capillary is therefore significantly more complex, since each segment of the curved weld seam has a different optimal position of the measuring spot to be determined or set in advance for each segment. For a correct weld depth measurement, the segments must therefore either be chosen to be very small, or interpolation must be carried out between the segments.

Typically, an optical coherence tomograph has a single measuring beam. Accordingly, a distance measurement can only be carried out at a single point on the workpiece surface at any given time. This means that measurements can either be taken at the deepest point of the vapor capillary or in the vicinity thereof (e.g., a side wall of the vapor capillary, the workpiece surface, or the seam upper bead). If the measuring beam is kept unchanged at a predetermined position, it cannot be determined from the obtained distance information whether the position of the measuring beam is the deepest point of the vapor capillary or whether the measuring beam hits a side wall of the vapor capillary.

If there are no other devices to obtain information about the vapor capillary in addition to the optical coherence tomograph, it is necessary to move the position of the measuring beam over the workpiece surface and thus to create a height profile (also called "depth profile") or a topography based on the position of the measuring spot known from the orientation of the optical measuring beam and the determined distance information. This is also referred to as "topography measurement". Therefrom, the position at which the deepest point of the vapor capillary is located can be determined or estimated. FIG. 2 shows an example of a measured depth profile of a vapor capillary along or in parallel to the machining direction (FIG. 2A) and transversely to the machining direction of the laser beam (FIG. 2B). The vapor capillary can be recognized as a peak.

Accordingly, the optical measuring beam is temporarily not at the deepest point of the vapor capillary while a height profile is being created or a topography is being measured. As a result, reliable information about the welding depth cannot be collected during this time. By using high scanning rates of the optical coherence tomograph (kHz or MHz range) and fast beam deflection units (e.g., galvanoscanners), this time can be kept short, but not reduced to zero. In particular, if the welding depth is to be controlled to be a predetermined value, it is advantageous or absolutely necessary to obtain information about the deepest point of the vapor capillary in time intervals which are constant or as short as possible. The optical coherence tomograph should therefore preferably measure the deepest point of the vapor capillary as continuously or as uninterruptedly as possible. This means that the position of the deepest point of the vapor capillary must be known for an uninterrupted weld depth measurement.

An alternative to the described creation of a height profile of the workpiece surface using the optical coherence tomograph is establishing a mathematical model which can be used to calculate the optimal position of the measuring beam as a function of the given process parameters. Such a model is very complex due to the large number of different welding parameters. In addition, such a procedure requires a lot of effort to establish and evaluate the model based on experiments. Furthermore, this approach does not solve the problem that, e.g. in the event of a drift of the deflection unit or inaccuracies, an incorrect position of the measuring beam is not recognized.

Another alternative is the use of a second optical coherence tomograph. The first optical coherence tomograph continuously scans the workpiece surface in order to create a height profile or a topography thereof. The second optical coherence tomograph permanently measures the depth of the vapor capillary. However, the two tomographs must be calibrated with respect to each other and must not move relative to one another during operation, e.g. due to drift. Otherwise the correlation between the position of incidence of the first tomograph and the measured depth of the second tomograph is no longer valid. However, this alternative is uneconomical due to high costs. As an alternative thereto, the measuring beam of an optical coherence tomograph could be split into two partial beams, the partial beams being adjustable independently of one another. However, the available measuring range of the optical coherence tomograph must then be divided into two ranges since two sets of distance information are available at the same time. This reduces the measuring range available for the welding depth measurement. Furthermore, with these alternatives there is also the problem that, in the event of a drift, the position of the measuring beam measuring the depth of the vapor capillary is no longer exactly known.

SUMMARY OF THE INVENTION

It is therefore an object of the present invention to provide a laser machining system and a method for controlling a laser machining system allowing a welding depth or depth of a vapor capillary and information about a position of an optical measuring beam used to measure the depth of a vapor capillary to be determined, preferably in real time or continuously.

This object is achieved by the subject matter of the independent claims. Advantageous embodiments and developments are the subject matter of dependent claims.

The invention is based on the idea of using an image acquisition unit to capture both a vapor capillary produced by a laser of the laser machining system in a workpiece and the point of incidence of an optical measuring beam of an optical measuring device of the laser machining system. For example, the image acquisition unit may capture light projected or reflected by the vapor capillary and light of the optical measuring beam appearing as a measuring spot at the point of incidence on the workpiece and, based thereon, generate an image containing the vapor capillary and the point of incidence of the measuring beam.

Thereby, the position of the optical measuring beam and the position of the vapor capillary may be determined and adjusted for an accurate and continuous measurement of the depth of the vapor capillary, e.g. by interferometric distance measurement, during a machining process, preferably in real time. The position of the measuring spot may then be adjusted based on an ideal position relative to the position of the vapor capillary for measuring the maximum depth of the vapor capillary. An interruption of the measurement of the welding depth or the depth of the vapor capillary by the optical measuring device or of the control of the measuring position is therefore not necessary. The point of incidence of the optical measuring beam on the workpiece and its alignment with a suitable position for measuring the depth of the vapor capillary may thus be carried out reliably, inexpensively and simply.

According to an aspect of the present disclosure, a laser machining system, preferably a laser welding system or a system for laser deep welding, comprises: a laser machining head for irradiating a laser beam onto a workpiece, in particular onto a workpiece surface, for generating a vapor capillary; an optical measuring device for measuring the distance, in particular for measuring a depth of the vapor capillary, by means of an optical measuring beam; an image acquisition unit configured to acquire an image of a region of the workpiece or the workpiece surface containing the vapor capillary and a measuring spot generated by radiating the optical measuring beam, wherein the laser machining system or the image acquisition unit is configured to determine a position of the measuring spot and a position of the vapor capillary based on the captured image. The measuring spot is the location on the workpiece at which the optical measuring beam is incident and may also be referred to as the point of incidence or the region of incidence of the optical measuring beam.

According to a broad aspect of the present disclosure, a method for controlling a laser machining system comprises the following steps: projecting the laser beam onto a workpiece surface to produce a vapor capillary; projecting an optical measuring beam onto the workpiece surface to measure a depth of the vapor capillary; capturing an image of a region of the workpiece surface containing the vapor capillary and a measuring spot produced by projecting the optical measuring beam; and determining, based on the captured image, a position of the measuring spot and a position of the vapor capillary. The method may, in particular, be configured to control a laser machining system according to embodiments of this disclosure. A laser machining system according to embodiments of this disclosure may, in particular, be configured to carry out a method according to the disclosure.

Preferred aspects of the present disclosure that can be combined with one another are listed below.

The image acquisition unit may be attached to the laser machining head or may be integrated therein. The image acquisition unit may be a camera or digital camera configured to take photos of the workpiece, in particular of the region of the workpiece containing the vapor capillary and the point of incidence of the optical measuring beam. The digital camera may also record or generate a video or a video stream.

The image acquisition unit is preferably arranged coaxially on the laser machining head. This avoids parallax errors in the image evaluation. This also allows for a compact and space-saving design of the laser machining system. Optical axes or beam paths of the image acquisition unit and of the measuring beam preferably extend at least partially in parallel and/or coaxially, preferably at least partially in parallel and/or coaxially in the laser machining head. The image acquisition unit or a camera of the image acquisition unit may be arranged coaxially with a beam path of the laser beam and/or the measuring beam.

In an embodiment, the image acquisition unit is configured to capture thermal radiation, in particular radiation between 950 nm and 1700 nm. Thermal radiation is emitted by the surface of the workpiece heated by the laser beam and in particular by the vapor capillary. Accordingly, the image acquisition unit may comprise an infrared camera. As an alternative or in addition, the image acquisition unit may be configured to detect light of the visible spectral range, preferably light between 300 nm and 1100 nm, in particular light between 400 nm and 800 nm.

The image acquisition unit may have a spectral sensitivity in the wavelength range of thermal radiation generated by the vapor capillary or the melt pool and/or in the wavelength range of the optical measuring beam. The image acquisition unit is preferably particularly sensitive in a wavelength range of the measuring beam. This results in a higher contrast in the captured image between the measuring spot and the workpiece surface. As a result, the measuring spot can be illustrated on the captured image and then be evaluated particularly easily. In particular, the position of the measuring spot may be determined particularly reliably thereby.

By means of an appropriate evaluation of the image or video, e.g., by appropriate image processing, the position of the vapor capillary on the workpiece and the geometry of the vapor capillary and/or the melt pool can be recognized or identified. For example, a contour of the melt pool may be recognized. Furthermore, melted regions and/or solidified regions of the workpiece may be recognized or differentiated. This recognition may be performed using texture analysis. On the other hand, the measuring spot may be determined. In particular, the geometric center of the measuring spot and/or the geometric center of the vapor capillary may be determined. This can be achieved by means of suitable image processing methods, for example texture analysis, evaluation of the shape of the melt pool, etc. The position of the measuring spot relative to the position of the vapor capillary, preferably relative to the deepest point of the vapor capillary, can thus be determined. The evaluation may be carried out by the image acquisition unit itself or by an arithmetic unit of the laser machining system. The evaluation of the captured image or images may be carried out essentially in real time.

As a result, the laser machining system may be configured to control the measuring beam such that it is always oriented or positioned correctly for measuring the welding depth, i.e., at the optimal position on the workpiece. In particular, the position of the measuring beam may be controlled relative to the position of the vapor capillary and/or the position of the laser beam. Furthermore, the focus position and/or orientation of the optical measuring beam may be controlled. The measuring beam may be controlled in real time. Furthermore, the image evaluation may be used to check whether the measuring beam is correctly positioned or oriented.

By providing the image acquisition unit and evaluating the images of the workpiece surface captured by the image acquisition unit, the position of the measuring spot may be determined and/or adjusted continuously, i.e., without interruption. In other words, the position of the measuring spot can always be determined reliably and in real time. In addition, no additional optical measuring device is required, so that costs are avoided.

The optical measuring device may be configured to direct the optical measuring beam into the vapor capillary. This allows for a maximum depth of the vapor capillary to be determined. In particular, a position of the vapor capillary with maximum depth may be determined or estimated on the basis of the image. As a rule, the deepest point of the vapor capillary in the machining direction is at the rear edge of the vapor capillary. In this case, if the measuring beam is controlled such that it is directed to this position, a maximum depth of the vapor capillary can be determined.

Furthermore, the laser machining system or the optical measuring device may have an adjusting device configured to adjust or orient the optical measuring beam. The adjusting device may, for example, comprise a beam deflection unit, for example a mirror or galvanoscanner, and may be controlled by a computing unit of the laser machining system or the optical measuring device.

The image acquisition unit preferably has a notch filter configured to filter or block a wavelength range of the laser beam. This ensures that the image acquisition unit does not drive into saturation due to the high light output of the laser beam compared to the light output of the optical measuring beam and the vapor capillary. In addition, light emitted or reflected by the vapor capillary and light of the measuring beam reflected by the workpiece may be reliably detected by the image acquisition unit without being superimposed by the light of the laser beam.

The measuring device preferably comprises an optical coherence tomograph. The image acquisition unit preferably comprises a camera, for example a CCD camera and/or a CMOS camera and/or an infrared camera.

According to an embodiment, a lighting unit is provided on the laser machining head for illuminating the detected area of the workpiece surface, e.g. by means of visible light and/or infrared light. As a result, the evaluation of the image of the workpiece region captured by the image acquisition unit can be improved or simplified, since, for example, the vapor capillary stands out more strongly from the background and is therefore more visible. In addition, the wavelength range of light reflected by the vapor capillary may be adjusted to the wavelength range of light in which the image acquisition unit is sensitive (so-called "spectral sensitivity").

The lighting unit may be configured to couple light into the beam path of the laser beam and/or the optical measuring beam and/or the image acquisition unit. As a result, the light from the lighting unit may be directed onto the workpiece on the same way or in the same manner as the laser beam or the optical measuring beam. In other words, the light of the lighting unit extends within the machining head of the laser machining system at least in segments. Accordingly, an adaptation of the laser machining head or an end section of the laser machining head to the lighting unit may be avoided.

The laser machining system or the optical measuring device may include a visualization unit configured generate a visualization beam for visualizing the point of incidence of the optical measuring beam and to couple said beam into the beam path of the measuring beam. A visualization spot generated by the projection of the visualization beam is preferably concentric with the measuring spot. A wavelength of the visualization beam may be adapted to the spectral sensitivity of the image acquisition unit. In addition, the power of the visualization beam may be selected or set purposefully and independently of the power of the optical measuring beam. As a result, in particular, a visualization beam with a significantly higher power than that of the optical measuring beam may be chosen. In addition, the wavelength of the visualization beam may be selected or set such that reflected light from the visualization beam passes the notch filter of the image acquisition unit as unimpaired as possible. In other words, the wavelength of the visualization beam may be chosen such that the notch filter is essentially transparent to the visualization beam. Since the measuring spot and the visualization spot are concentric, the position of the measuring spot can be determined based on the position of the visualization spot in the captured image. The visualization beam preferably has a wavelength different from the wavelength of the laser beam.

The visualization beam may be coupled into an optical fiber of the optical measuring device, in which the optical measuring beam is guided, by means of a fiber coupler. In other words, the visualization beam is coupled, at least in segments, into an optical fiber of the optical measuring device, i.e., already at a point before the measuring beam is introduced into the laser machining head. Since the visualization beam is already coupled into the optical fiber of the optical measuring device, the visualization beam is projected onto the same position on the workpiece as the measuring beam. Therefore, a lateral offset between the position of the visualization spot and the measuring spot due to adjustment errors, drift of deflection units, or other inaccuracies in the machining head of the laser machining system may be avoided.

Preferably, a wavelength of the visualization beam is smaller than a wavelength of the measuring beam. Losses in the light power of the visualization beam when coupling it into the optical fiber of the optical measuring device may thereby be avoided. A monomode fiber for the wavelength of the measuring beam may therefore be used.

According to an embodiment, the laser machining system further comprises a computing unit. The computing unit can comprise or may be a control unit of the laser machining system for controlling the same. The computing unit may be configured to perform one or more functions of the image acquisition unit and/or the optical measuring device. In particular, the computing unit may be configured to evaluate the image captured by the image acquisition unit as described above or to determine a position of the measuring spot and/or a position of the vapor capillary based on the image captured by the image acquisition unit. Furthermore, the computing unit may be configured to adjust or control a position of the optical measuring beam or a position of the measuring spot relative to the vapor capillary. The computing unit may be configured to perform a method according to the disclosure.

Preferably, the position of the measuring spot relative to the position of the vapor capillary is controlled in real time and a maximum depth of the vapor capillary is continuously determined.

BRIEF DESCRIPTION OF THE DRAWING

Exemplary embodiments of the disclosure are shown in the figures and are described in more detail below. In the figures.

DETAILED DESCRIPTION OF THE INVENTION

In the following detailed description, same reference signs refer to the same or corresponding elements.

Figure 3:
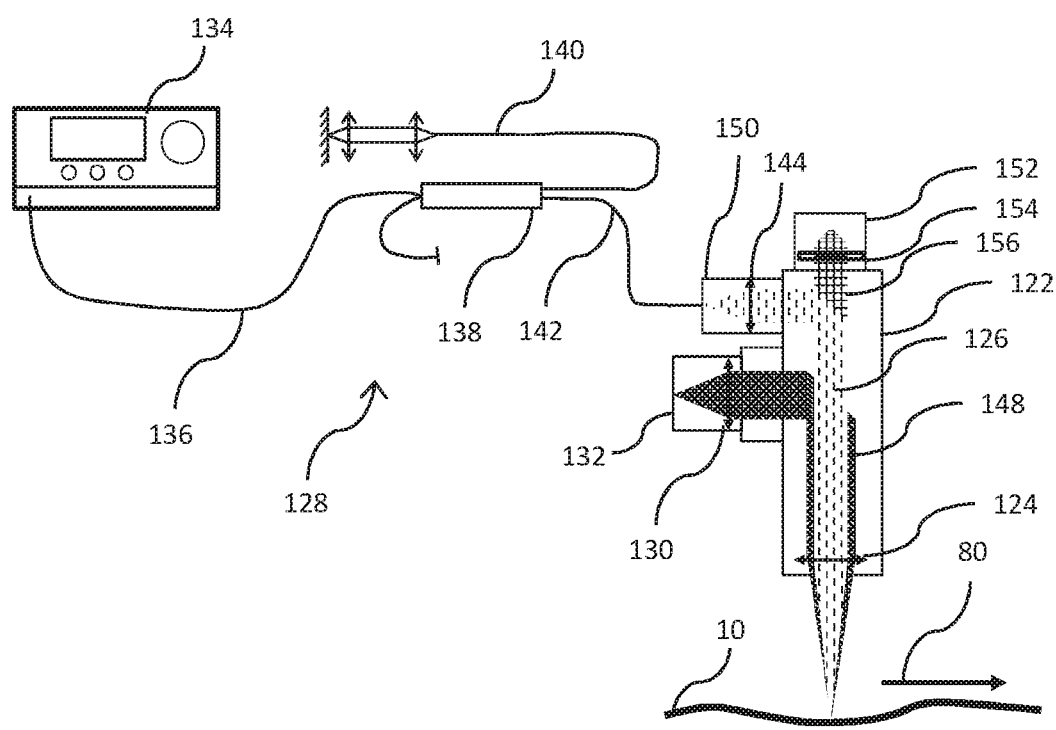
FIG. 3 is a schematic view of a laser machining system according to a first embodiment of the invention.

FIG. 3 is a schematic view of a laser machining system 100 according to a first embodiment of the present invention. The laser machining system 100 comprises a machining head 122, for example a laser welding head or a laser cutting head.

The laser machining system 100 further comprises a laser device (not shown) for providing a laser beam 148 (also referred to as a "machining beam" or "machining laser beam") and an optical measuring device 128 configured for interferometric distance measurement by means of an optical measuring beam 126. For example, a distance between a workpiece 10 to be machined and an end portion of the machining head 122, such as a nozzle or a cross jet, is measured. The end portion, such as the nozzle or cross jet, has an opening through which the laser beam 148 exits from the machining head 122, optionally along with a process gas.

The laser machining system 100 or parts thereof, for example the machining head 122, may be movable along at least one machining direction 80. The machining direction 80 may be a cutting or welding direction and/or a moving direction of the laser machining system 100, such as the machining head 122, with respect to the workpiece 10. In particular, the machining direction 80 may be a horizontal direction. The machining direction 80 may also be a lateral direction with respect to a surface of the workpiece 10 to be machined. The machining direction 80 may also be referred to as the "feed direction".

The laser machining system 100 may have a collimator optics 130 for collimating the laser beam 148. Within the machining head 122, the laser beam 148 may be deflected or reflected by approximately 90° in the direction of the workpiece 10 by means of suitable optics (not shown). The optics, for example a semitransparent mirror, may be configured to transmit light, for example light reflected from the workpiece 10, such as light from the measuring beam 126 or from a lighting unit or visualization unit described later, to the measuring device 128. The collimator optics 130 may be integrated into the machining head 122. For example, the machining head 122 may comprise a collimator module 132 integrated into the machining head 122 or mounted on the machining head 122.

The optical measuring device 128 may comprise a coherence tomograph or may be a coherence tomograph. The coherence tomograph may comprise an evaluation unit 134 with a broadband light source (e.g., a superluminescent diode, short "SLD") which couples the measurement light into an optical waveguide 136. In a beam splitter, which preferably has a fiber coupler 138, the measurement light is typically split into a reference arm 140 and a measuring arm leading into the machining head 122 via an optical waveguide 142. The optical measuring device 128 may further comprise a collimator optics 144 configured to collimate an optical measuring beam 126. The collimator optics 144 may be integrated into the machining head 122. For example, the machining head 122 may comprise a collimator module 150 integrated into the machining head 122 or mounted on the machining head 122.

Furthermore, a focusing optics 124 configured to focus the laser beam 148 and/or the optical measuring beam 126 on the workpiece 10 is provided in the machining head 122. The focusing optics 124 may be a common focusing optics, such as a focus lens, for the laser beam 148 and the measuring beam 126.

In some embodiments, the laser beam 148 and the optical measuring beam 126 may extend in parallel or even coaxially at least in segments, and in particular may be coaxially superimposed at least in segments. For example, the optical measuring device 128 may be configured to couple the optical measuring beam 126 into a beam path of the laser device 100. The optical measuring beam 126 and the laser beam 148 may be combined downstream of the collimator optics 144 and upstream of the focusing optics 124. Alternatively, the beam paths of the measuring beam 126 and the laser beam 148 may be guided largely separately and may only be merged downstream of the focusing optics 124 and upstream of the opening of the laser machining head 122. The beam axes of the laser beam 148 and the measuring beam 126 may extend in parallel to one another or even coaxially near the opening or the end portion of the laser machining head 122, and are preferably essentially perpendicular to the surface of the workpiece 10. In this case, a separate focus lens may be provided for each of the measuring beam 126 and the laser beam 148, so that both beams can be focused on the workpiece.

The principle of distance measurement described herein is based on the principle of optical coherence tomography using the coherence properties of light by means of an interferometer. For distance measurement, the optical measuring beam 126 is directed onto a surface of the workpiece 10. The light of the measuring beam reflected back from the surface is mapped onto the exit/entry surface of the optical waveguide 142, superimposed with the reflected light from the reference arm 140 in the fiber coupler 138 and then directed back into the evaluation unit 134. The superimposed light contains information about the path length difference between the reference arm 140 and the measuring arm. This information is evaluated in the evaluation unit 134, thereby giving the user, for example, information about the distance between the surface of the workpiece and the machining head 122 or about a depth of a vapor capillary.

In order to determine the depth of the vapor capillary, the optical measuring beam 126 is directed into the vapor capillary and reflected back to the measuring device 128 in the vapor capillary. Additionally, a distance to the workpiece surface 16 or a position of the workpiece surface may be known. Thus, the measuring device 128 or the evaluation unit 134 may define a depth of the vapor capillary, i.e., determine the distance of a reflective bottom of the vapor capillary to the surface 16 of the workpiece 10 based on the reflected measuring light. For an exact determination of the depth of the vapor capillary, however, the measuring beam 126 must be directed to the deepest point of the vapor capillary.

The laser machining device 100 further comprises an image acquisition unit 152, for example a camera. As shown in FIG. 3, the image acquisition unit 152 may be arranged coaxially on the laser machining head 122 or may be integrated coaxially in the laser machining head 122. A beam path 156 of the image acquisition unit 152 extends at least in sections through the machining head 122, so that the image acquisition unit 152 can capture an image of the machining region of the workpiece 10, in particular a region of the workpiece 10 containing the vapor capillary 12 and the measuring spot. In some embodiments, an optical axis of the image acquisition unit 152 and the optical measuring beam 126 may run in parallel at least in segments or may, in particular, be coaxially superimposed at least in segments. In other words, the image acquisition unit 152 may comprise a coaxial camera.

The image acquisition unit 152 is configured to detect light or electromagnetic radiation reflected from the workpiece 10 to be machined or light or electromagnetic radiation emitted from the workpiece 10 to be machined and to capture or generate, based thereon, an image of the workpiece 10, in particular an image of a region of the surface the workpiece 10. The emitted light or emitted electromagnetic radiation includes, for example, thermal radiation emitted by the vapor capillary or melt pool generated due to the elevated temperature of the material of the workpiece 10. The reflected light or reflected electromagnetic radiation includes, for example, light of the measuring beam 126 reflected by the surface of the workpiece 10 or the bottom of the vapor capillary.

In particular, the image acquisition unit 152 is configured to capture an image of a region of the surface of the workpiece 10 to be machined, said region containing the vapor capillary and the point of incidence or measuring spot of the measuring beam 126. The region may further contain the melt pool. The image acquisition unit 152 may be configured to capture an image of the region at regular time intervals or continuously. The image acquisition unit 152 may capture a video or a video stream of the region. By capturing the vapor capillary, an ideal point of the vapor capillary for measuring the depth of the vapor capillary that corresponds approximately to the deepest point of the vapor capillary can be determined based on the image. Since the measuring beam 126 is also captured in the image, said beam can be directed at the deepest point of the vapor capillary for the depth measurement or it can be checked whether the measuring beam 126 is directed at the deepest point.

The image acquisition unit 152 or the camera may be configured to capture thermal radiation, i.e., infrared light, and/or light of the visible spectral range. Silicon-based camera chips (e.g., CCD, CMOS) sensitive in a wavelength range of approx. 300 nm to 1100 nm, or InGaAs-based camera chips sensitive in the wavelength range of approx. 950 nm to 1700 nm may be used for capturing the vapor capillary. A wavelength range of the laser emission is preferably blocked, since otherwise there is a risk of the camera image being driven to saturation by the laser radiation, which usually has a few kilowatts.

In order for the point of incidence of the optical measuring beam 126 to be detectable, the image acquisition unit 152 or the camera is sensitive in the wavelength range of the light of the measuring beam 126. Typical wavelengths or wavelength ranges for an optical coherence tomograph based on the so-called Fourier Domain OCT are 800 nm to 900 nm, 1000 nm to 1100 nm, 1310 nm or 1550 nm. Other emission wavelengths are possible.

The image acquisition unit 152 may also include a so-called notch filter 154. The notch filter 154 is configured to block the machining laser, in particular reflected light from the laser beam 148, in order to avoid driving the captured image into saturation. In addition, it can be ensured by means of the notch filter 154 that the vapor capillary and the measuring spot of the optical measuring beam 126 are clearly recognizable on the captured image and are not masked by the light of the laser beam 148.

Typical machining lasers emit in a narrow band in the wavelength range from 1030 nm to 1070 nm, for example at 1030 nm, 1064 nm or 1070 nm. Further emission wavelengths are possible. The notch filter should therefore be designed or optimized in such a way that the wavelength or the wavelength range of the light from the laser beam 148 is filtered out and not transmitted to the image acquisition unit 152.

On the other hand, the wavelength or the wavelength range of the optical measuring beam 126 should be chosen such that it is not filtered or blocked by the notch filter 154. Accordingly, the wavelength or the wavelength range of the optical measuring beam 126 is preferably different from the wavelength or the wavelength range of the light of the laser beam 148. The notch filter 154 may also be designed to be transparent not only for the wavelength range of the measuring beam 126, but also for the visible spectral range or the infrared range, so that the image acquisition unit 152 can capture the vapor capillary based on the thermal radiation in the infrared range or based on visible light. As an alternative to the notch filter 154, the image acquisition unit 152 may also be configured such that it is not sensitive to the wavelength range of the laser beam 148.

In order for the point of incidence of the optical measuring beam 126 to be visible in the image, the intensity of the measuring spot on the workpiece must be high enough to be captured by the image acquisition unit 152. In particular, when the measuring beam is directed into the opening of the vapor capillary, the proportion that is reflected or scattered back into the image acquisition unit 152 or into the camera is considerably reduced. Then there is only scattering or reflection on the side walls of the vapor capillary or on particles which are located in the region of the opening of the vapor capillary. If the laser device and the optical coherence tomograph emit at similar wavelengths (e.g., OCT at 1030 nm and laser at 1070 nm), the requirements for the notch filter increase considerably since the notch filter has to fully suppress the laser by several orders of magnitude, but has to transmit the wavelength of the OCT completely.

If the optical coherence tomograph is operated with commercially available superluminescent diodes (SLD), there are usually a few tens or a few hundred milliwatt of light power available. Compared to several kilowatt of light power for the machining laser, the power of the SLD is very low.

Figure 4:
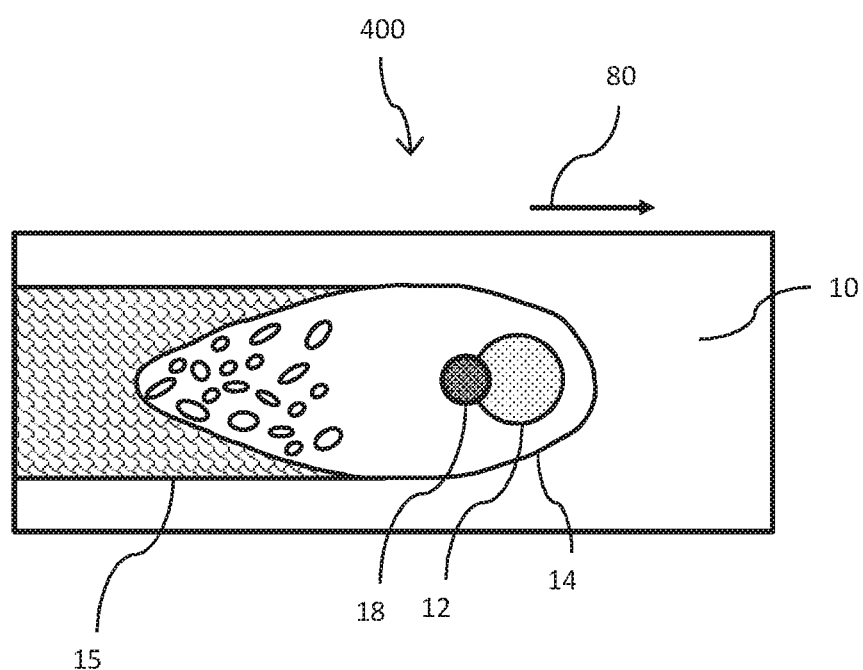
FIG. 4 shows a schematic view of an image captured by an image acquisition unit of a laser machining system according to embodiments.

FIG. 4 shows an example of an image 400 as can be captured or generated by the image acquisition unit according to embodiments of the present invention.

The image 400 may be captured or generated as a digital image or photo. The image may have a plurality of pixels.

The image 400 is a top view of a region or portion of a workpiece 10 machined by a laser machining system according to embodiments of the present invention. The image 400 is captured during a laser machining process performed by the laser machining system according to embodiments of the present invention. In FIG. 4, the machining direction 80 of the laser machining process is indicated by an arrow.

The image 400 shows the region or portion of the workpiece 10 containing the vapor capillary 12, the melt pool 14 surrounding the vapor capillary 12, and the seam upper bead 15 following the melt pool 14, in plan view, i.e. from the perspective of the image acquisition unit 152.

Figure 1:
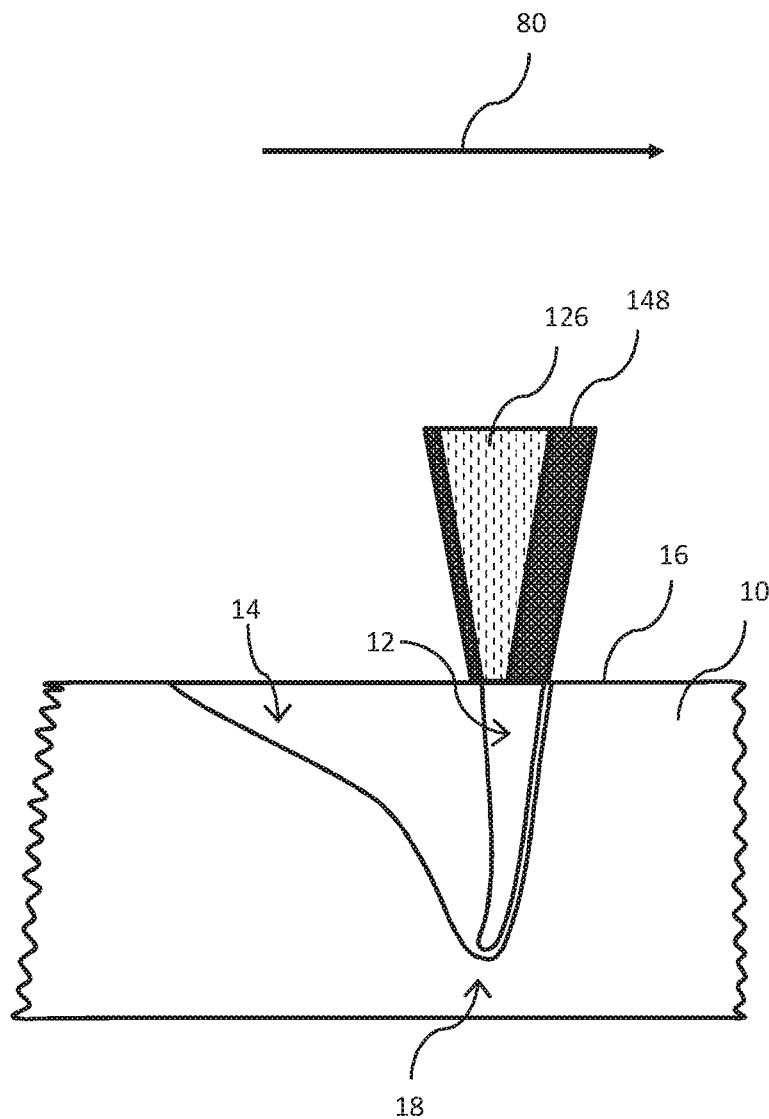
FIG. 1 is a schematic cross-sectional view of a workpiece.
Figures 2A, 2B:
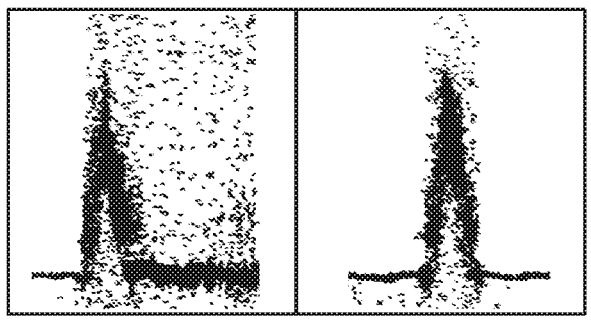
FIGS. 2A and 2B show exemplary measurements of a depth profile of a workpiece.

In addition, the image 400 contains the measuring spot 18 created when the optical measuring beam 126 hits a surface. As can be seen in FIG. 4, the measuring spot 18 has a round shape. The measuring spot 18 may also have an oval or circular shape, depending on the angle of incidence on the surface. Since the deepest point of the vapor capillary 12 is located at the rear edge thereof in the machining direction (see FIG. 1), the optical measuring beam 126 must accordingly be directed to this point in order to be able to correctly determine the depth of the vapor capillary. The optical measuring device may include a control configured to control the alignment of the optical measuring beam 126 with the deepest point of the vapor capillary 12 based on the data acquired by the image acquisition unit 152.

The laser machining system or the image acquisition unit itself may be configured to perform image evaluation almost in real time in order to determine the position of the vapor capillary 12 on the workpiece and the position of the measuring spot 18 in the image captured by the image acquisition unit. For example, the geometric center of the measuring spot and/or the geometric center of the vapor capillary may be determined in the image evaluation. Thus, the position of the measuring spot relative to the position of the vapor capillary, preferably relative to the deepest point of the vapor capillary, may be determined. In addition to measuring the depth of the vapor capillary, also a vicinity of the vapor capillary 12 may be recorded and, for example, a so-called topography measurement may be carried out. Thereby, a seam may be found immediately before the welding process or the quality of the seam upper bead 15 may be measured immediately after the welding process. In addition, a geometry of the vapor capillary and/or the melt pool may be determined. For example, a contour of the melt pool may be recognized. Furthermore, melted regions and/or solidified regions of the workpiece may be recognized or differentiated. This may be achieved by means of suitable image processing methods such as filtering, texture analysis, evaluation of the shape of the melt pool, etc.

Furthermore, the laser machining system or the optical measuring device may be configured to control a position of the measuring beam 126 based on the determination of the position of the measuring spot or the measuring beam and the position of the vapor capillary such that it is always correctly oriented or positioned for the measurement of the welding depth. In particular, the position of the measuring beam relative to the position of the vapor capillary and/or the position of the laser beam may be controlled. The position of the measuring beam may be adjusted, for example, by beam deflection units such as mirrors, galvanoscanners, or the collimator optics described above. In addition, the focus position and/or orientation of the optical measuring beam may be controlled. In particular, the measuring beam may be controlled in real time.

Figure 5A:
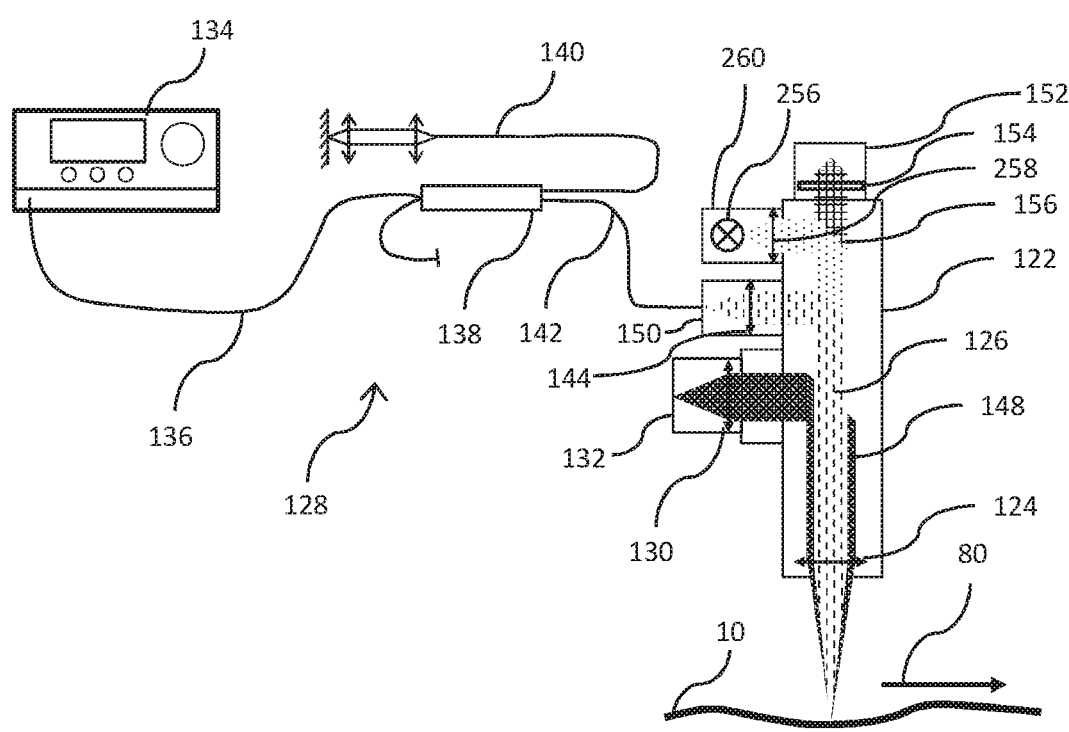
FIGS. 5A and 5B show schematic views of a laser machining system according to further embodiments of the present invention.
Figure 5B:
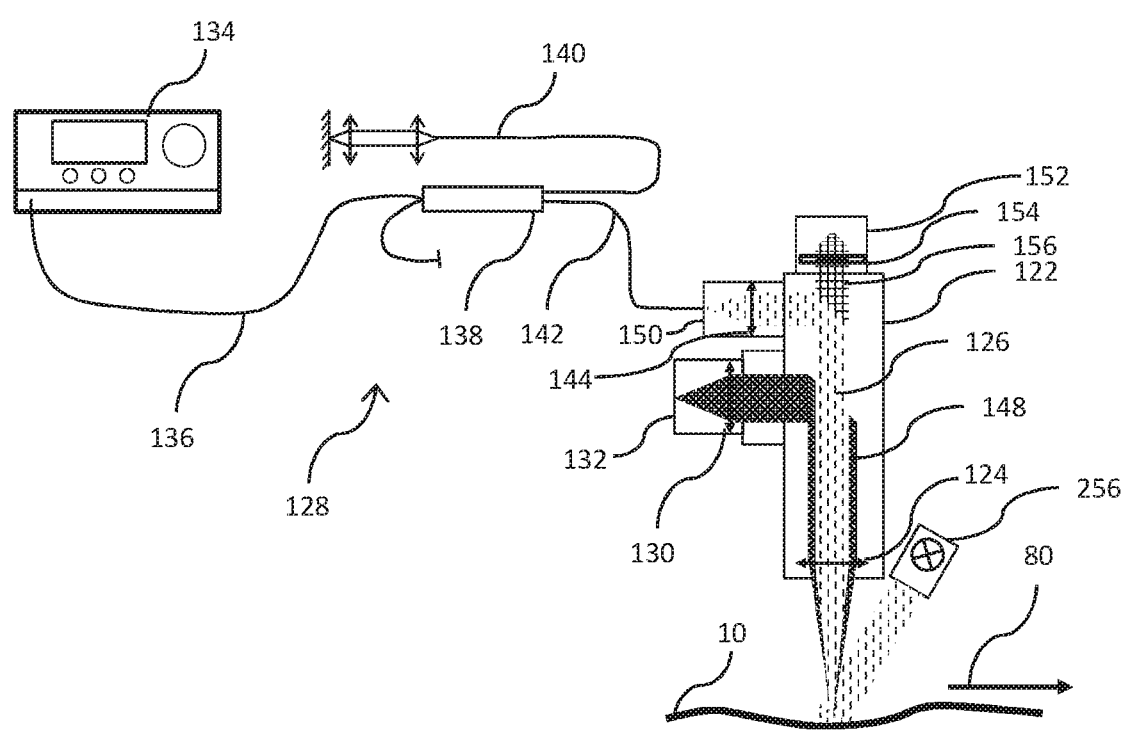

FIGS. 5A and 5B show laser machining systems 200 and 200' according to further embodiments of the present invention.

The laser machining system 200 corresponds to the laser machining system 100 described above with reference to FIG. 3, but has a lighting unit 256 for illuminating the machining region, i.e., the region of the workpiece surface 16 containing the vapor capillary 12 (and optionally the melt pool 14) and the measuring spot 18. If the visible spectral range is captured by the image acquisition unit 152, an illumination of the machining zone by a lighting unit 256 may be needed. The image acquisition unit 152 of the laser machining system 200 is then preferably configured to detect light of the visible spectral range. The illumination may be coaxial through the machining head 122, as shown in FIG. 5A. Alternatively, the lighting unit may be arranged laterally, that is to say externally, on the machining head, as shown in FIG. 5B.

The lighting unit 256 may be arranged on the laser machining head 122 or integrated into the machining head 122. The lighting unit 256 is provided to improve an image of the region of the workpiece surface 16 with the vapor capillary and the point of incidence of the measuring beam (the measuring spot 18) by the image acquisition unit 152. The lighting unit 256 is preferably configured to emit visible light and thus to illuminate the region captured by the image acquisition unit 152. Since the vapor capillary 12 and the melt pool 14, in particular, only emit a small amount of light in the visible spectral range, the illumination by the lighting unit 256 may increase their recognizability on the image captured by the image acquisition unit 152. Alternatively, the lighting could also emit in the infrared spectral range, in particular when using an infrared camera.

For example, as shown in FIG. 5A, the machining head 122 may comprise a lighting module 260 integrated into the machining head 122 or mounted on the machining head 122. The light emitted by the lighting unit 256 may be coupled into the beam path of the laser beam 148 and/or the optical measuring beam 126 and/or the image acquisition unit 152. Furthermore, the lighting module 260 may comprise a collimation optics 258 for collimating the light emitted by the lighting unit 256 into the beam path.

According to the embodiment illustrated in FIG. 5B, on the other hand, the lighting unit 256 is arranged on the laser machining head 200 such that the light emitted thereby hits the machining region, in particular the region of the workpiece containing the vapor capillary and/or the melt pool. In other words, the course of the light emitted by the lighting unit 256 is outside the beam path of the measuring beam 126 and the laser beam 148, that is to say not through the machining head 122.

Figure 6:
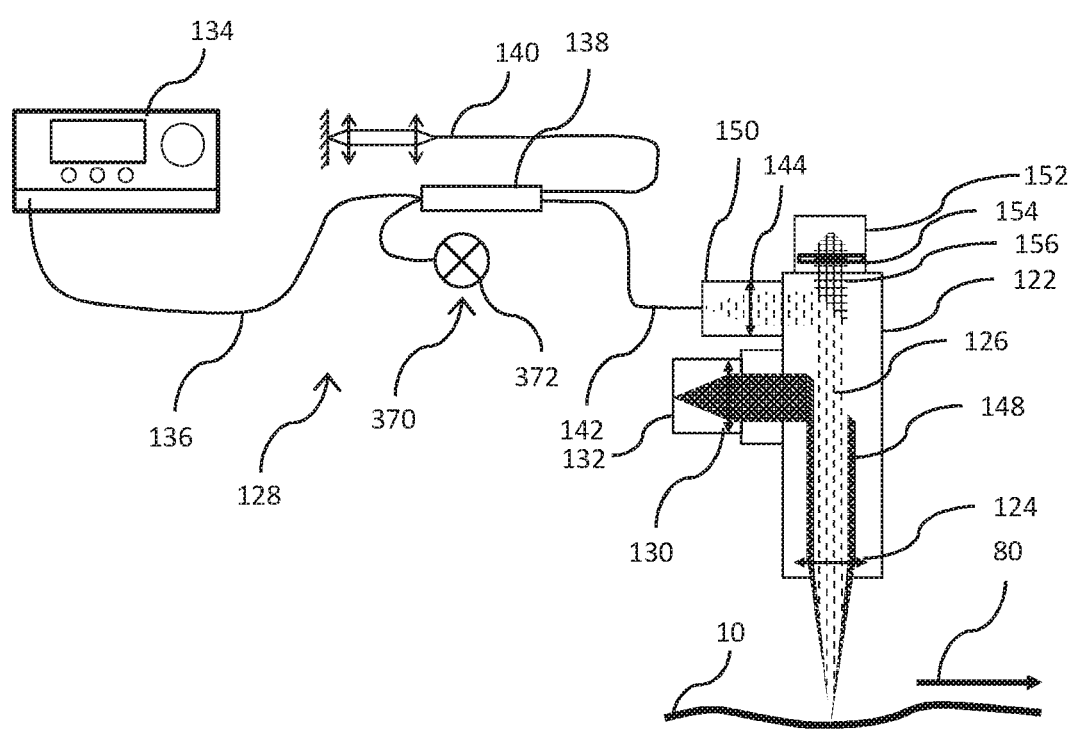
FIG. 6 shows a schematic view of a laser machining system according to a second embodiment of the present invention.

FIG. 6 shows a laser machining system 300 according to a second embodiment of the invention.

The laser machining system 300 corresponds to the laser machining system 100 described above with reference to FIG. 3, but has a visualization unit 370 for visualizing the optical measuring beam 126 or the measuring spot 18. The visualization unit 370 may include a light source 372 configured to generate a visualization beam (also called "visualization light beam"). Due to the limited light output of light sources for the optical measuring beam 126, for example conventional SLDs, the visualization unit 370 may be provided with the light source 372 in order to make the position of the optical measuring beam 126 visible in the image.

Light from the visualization unit 370 is preferably coupled into the beam path of the optical measuring beam 126. The coupling is preferably carried out by means of a beam splitter, for example the fiber coupler 138, configured to couple the visualization beam into the optical fiber 142 of the measuring arm of the optical measuring device 128. Accordingly, a visualization spot generated by projection of the visualization beam onto the workpiece 10 is superimposed on the measuring spot 18, and may in particular be concentric with the measuring spot 18.

Because the light generated by the visualization unit 370 is already coupled into an optical fiber of the optical coherence tomograph, the visualization spot is imaged onto the same lateral position on the workpiece 10 as the measuring beam 126 by the optical imaging in the machining head 122. In contrast to a coupling or superimposition in the machining head 122 by means of a beam splitter in the machining head 122, there is no lateral offset due to adjustment errors or other inaccuracies in case of coupling into the optical fiber of the optical coherence tomograph. If the optical coherence tomograph and the illuminating light source have different wavelengths, there may be an axial displacement of the two focus positions. However, there is no lateral shift of the focus points when the two beams are coaxial. Accordingly, the measuring spot and the visualization spot are concentric.

Since no further requirements are placed on the light source 372 of the visualization unit 370, a light source 372 with the highest possible light power may be selected. Furthermore, the wavelength or the wavelength range of the light generated by the light source 372 may be adapted to the spectral sensitivity range of the image acquisition unit 152. In the case of optical coherence tomographs using optical measuring beams with a wavelength close to the wavelength of the laser light, the wavelength of the light source 372 may be chosen such that it is sufficiently far spectrally from the wavelength of the laser light. Thus, the notch filter 154 may be optimized such that it maximally suppresses light of the laser beam 148 while being maximally transparent with respect to a wavelength of the light source 372.

Thus, the visualization beam serves to visualize the point of incidence of the optical measuring beam 126 and makes the point of incidence of the measuring beam, or the measuring spot 18, more visible in the camera image. This is because the visualization spot is concentric with the measuring spot and clearly brighter than the measuring spot and is therefore more easily detectable by the image acquisition unit 152.

It is advantageous to choose the wavelength of the light emitted by the light source 372 to be shorter than the wavelength of the optical coherence tomograph or the optical measuring beam 126. Typically, it is necessary for the optical coherence tomograph to use so-called monomode fibers. These fibers have a core diameter that corresponds to approximately one tenth of the wavelength that is to be transmitted thereby. As a result, only the transverse fundamental mode "TEM00" can propagate in the waveguide. The so-called "cut-off wavelength" of an optical fiber indicates the wavelength up to which only the TEM00 mode can propagate. If shorter-wave light is coupled in, higher transverse modes may also be formed and this is referred to as a so-called multimode fiber. For the wavelength of the light generated by the light source 372, this means that with sufficient mixing of the modes in the optical fiber, the exit diameter is larger than in the case of a monomode fiber. However, the center of the light distribution remains the same, which is the reason why the center and thus the lateral position of the point of incidence of the measuring beam can still be detected. If, on the other hand, the wavelength of the light source 372 is chosen to be longer than the wavelength of the optical coherence tomograph, enormous losses occur during coupling into the optical fiber, thereby cancelling the effect of a powerful light source 372.

Figure 7:
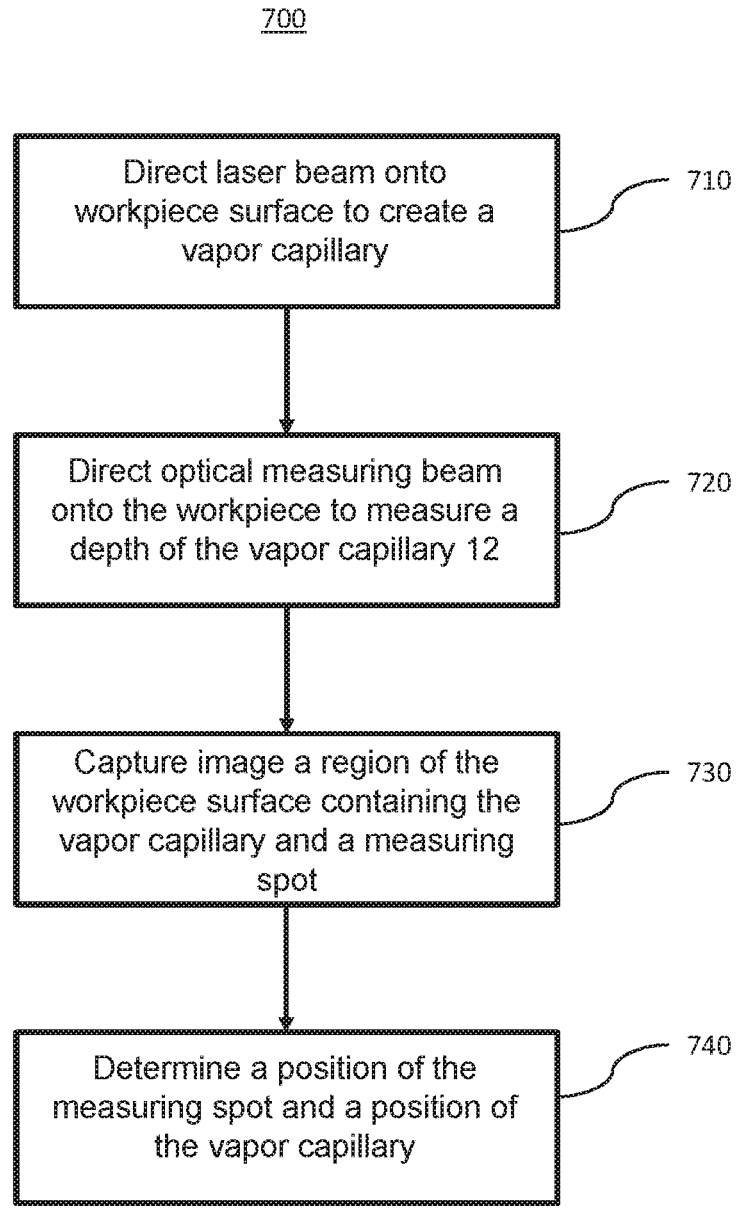
FIG. 7 shows a block diagram illustrating a method for machining a workpiece by means of a laser beam according to an embodiment of the present invention.

FIG. 7 shows a method for machining a workpiece by means of a laser beam according to an embodiment of the invention. The method may be performed by a laser machining system according to the embodiments described herein and has the following steps.

In step 710, a laser beam 148 is directed onto a workpiece surface 16 to create a vapor capillary. Subsequently or simultaneously, an optical measuring beam 126 is directed onto the workpiece 10 in step 720 in order to measure a depth of the vapor capillary 12. In step 730, an image of a region of the workpiece surface 16 containing the vapor capillary 12 and a measuring spot 18 generated by irradiation with the optical measurement beam 126 is captured. Based on the captured image, a position of the measuring spot 18 and a position of the vapor capillary 12 on the workpiece 10, more precisely on the workpiece surface 16, are determined in step 740. Steps 710, 720, 730 and 740 may be carried out essentially simultaneously so that a relative orientation of the measuring spot 18 with respect to the vapor capillary 12 can be determined and/or adjusted essentially in real time.

The step of determining 740 may comprise evaluating the captured image. Among other things, geometric properties of the vapor capillary 12 and/or the measuring spot 18 may be recognized or detected during the evaluation. The evaluation may further comprise determining a center of the vapor capillary 12 and a center of the measuring spot 18. The centers may be centers with respect to area. The method may further comprise a step (not shown) of controlling or adjusting the position of the measuring spot 18. In particular, the position of the measuring spot 18 with respect to the vapor capillary 12 may be adjusted such that a maximum depth of the vapor capillary 12 can be measured or is measured with the optical measurement beam 126.

According to the invention, a point of incidence of the optical measuring beam, i.e., the position of the measuring spot and the position of the vapor capillary or the vapor capillary 12 are determined simultaneously so as to assign a depth measured by means of the optical measurement beam to a specific point on the vapor capillary. In particular, the position of the measuring spot relative to the vapor capillary may be set such that a maximum depth of the vapor capillary can be determined. In other words, the measuring beam may be directed to a point of the vapor capillary with maximum depth. This point is generally at the rear edge of the vapor capillary in the machining direction. The position of the measuring spot and the vapor capillary may be determined almost in real time and thus allow a continuous and reliable depth measurement of the vapor capillary. This allows for a processing quality to be increased, in particular in laser welding.

The invention claimed is:

1. A laser machining system, in particular a laser welding system, for machining a workpiece by means of a laser beam, said laser machining system comprising:
 a laser machining head for directing a laser beam onto a workpiece to produce a vapor capillary;

an optical measuring device for measuring a depth of said vapor capillary by an optical measuring beam; and an image acquisition unit configured to capture an image of a region of said workpiece containing said vapor capillary and a measuring spot produced by said optical measuring beam on said workpiece, wherein said laser machining system is configured to determine a position of said measuring spot and a position of said vapor capillary based on the captured image.

2. The laser machining system according to claim 1, further comprising an adjusting device configured to adjust the position of said measuring spot relative to the position of said vapor capillary in order to determine a maximum depth of said vapor capillary.

3. The laser machining system according to claim 1, wherein said optical measuring device comprises an optical coherence tomograph.

4. The laser machining system according to claim 1, wherein said image acquisition unit comprises a notch filter configured to block a wavelength range of said laser beam.

5. The laser machining system according to claim 1, wherein said image acquisition unit has a spectral sensitivity in the wavelength range of a thermal radiation emitted by said vapor capillary and/or in the wavelength range of said optical measuring beam.

6. The laser machining system according to claim 1, wherein said image acquisition unit comprises at least one of a camera, a CCD camera, a video camera, a CMOS camera, and an infrared camera.

7. The laser machining system according to claim 1, wherein said image acquisition unit is arranged coaxially on said laser machining head.

8. The laser machining system according to claim 1, wherein optical axes of said image acquisition unit and said measuring beam extend at least partially in parallel and/or coaxially.

9. The laser machining system according to claim 1, further comprising a lighting unit for illuminating the captured region of said workpiece by means of visible light and/or infrared light.

10. The laser machining system according to claim 9, wherein said lighting unit is arranged such that light from said lighting unit is directed onto said workpiece outside said laser machining head.

11. The laser machining system according to claim 9, wherein said lighting unit is configured to couple light into the beam path of said laser beam and/or said optical measuring beam and/or said image acquisition unit.

12. The laser machining system according to claim 1, further comprising:

a visualization unit configured to couple a visualization beam for visualizing said measuring spot into the beam path of said measuring beam, wherein a visualization spot generated by the visualization beam is concentric with said measuring spot.

13. The laser machining system according to claim 12, wherein said visualization unit is configured to couple the visualization beam into an optical fiber of said optical measuring device in which said optical measuring beam is guided.

14. The laser machining system according to claim 1, further comprising a computing unit configured to control the position of said measuring spot relative to the position of said vapor capillary in real time in order to continuously determine a maximum depth of said vapor capillary.

15. A method for controlling a laser machining system, in particular a laser welding system, the method comprising the steps of:

directing a laser beam onto a workpiece and producing a vapor capillary using a laser machining head;

directing an optical measuring beam from an optical measuring device onto said workpiece in order to measure a depth of said vapor capillary;

capturing an image of a region of said workpiece containing said vapor capillary and a measuring spot generated by said optical measuring beam using an image acquisition unit; and determining, based on the captured image, a position of said measuring spot and a position of said vapor capillary.

* * * * *